United States Patent [19]

Keeley et al.

[11] Patent Number: 5,341,501

[45] Date of Patent: Aug. 23, 1994

[54] PROCESSOR BUS ACCESS

[75] Inventors: James W. Keeley, Nashua, N.H.; Richard A. Lemay, Carlisle; Chester M. Nibby, Jr., Beverly, both of Mass.

[73] Assignee: Bull HN Information Systems Inc., Billerica, Mass.

[21] Appl. No.: 771,582

[22] Filed: Oct. 4, 1991

[51] Int. Cl.⁵ ............................................... G06F 9/46
[52] U.S. Cl. ........................................ 395/725; 395/325
[58] Field of Search ............... 395/275, 725, 250, 550, 395/325, 425, 800; 364/240, 927.93, 200, 244.9, 240.7, 240.8, 242.6, 242.93

[56] References Cited

U.S. PATENT DOCUMENTS

| | | | |
|---|---|---|---|
| 4,499,538 | 2/1985 | Finger et al. | 364/200 |
| 4,730,268 | 3/1988 | Marin | 364/900 |
| 4,779,089 | 10/1988 | Theus | 395/725 |
| 4,837,682 | 6/1989 | Culler | 364/200 |
| 5,038,276 | 8/1991 | Bozzetti | 364/242.92 |
| 5,127,089 | 6/1992 | Gay et al. | 395/325 |
| 5,193,197 | 3/1993 | Thacker | 395/725 |
| 5,202,966 | 4/1993 | Woodson | 395/325 |

*Primary Examiner*—Dale M. Shaw
*Assistant Examiner*—Moustafa M. Meky
*Attorney, Agent, or Firm*—Faith F. Driscoll; John S. Solakian

[57] ABSTRACT

A high performance microprocessor bus state machine couples to a synchronous local bus in common with another state machine for accessing a local memory according to a preestablished bus protocol. Circuit means cosines the state of a predetermined protocol bus signal indicating the release of the local bus and transitions of the clock signal which are not used for synchronizing the operations of the state machines. The resulting signal applies required address and control signals in advance to the local bus enabling the non-microprocessor state machine to generate the required address strobe to local memory on the next clock which follows the release of the local bus by the microprocessor which eliminates a clock cycle whenever local bus control passes from the microprocessor bus state machine to another state machine.

11 Claims, 3 Drawing Sheets

PROCESSOR BUS ACCESS

BACKGROUND OF THE INVENTION

1. Field of Use

This invention relates to data processing systems and more specifically to bus systems.

2. Prior Art

In general, when different sources share a common bus, care must be taken to ensure a smooth transition from one user to the other. In asynchronous bus systems, users gain access through the use of a priority resolution or arbitration networks. In such cases, the resolution or arbitration is completed during a previous cycle and the user designated as having been granted access, is allowed bus use for the next bus cycle.

In synchronous bus systems, such as that utilized with the Intel 486$^{tm}$ microprocessor, asserting a bus hold request (HOLD) input indicates that another bus master user desires control of the microprocessor's bus. The microprocessor responds by floating its bus and driving a bus hold acknowledge (HLDA) output lead to an active state, after completing the current bus cycle, burst cycle or sequence of locked cycles.

The microprocessor will remain in this state until HOLD is deasserted by the non-microprocessor user. Generally, the user bus master bus control circuits are clocked between the same edges of the basic clock signal provided by the system clock. However, if too little time is allowed for the bus transition, the bus master tristate circuit outputs can overlap, resulting in possible erroneous operations. If too much time allowed for the bus transition, system performance will suffer.

In order to avoid the tristate overlap problem described above, it becomes necessary to move out the bus enable of the other non-microprocessor bus master to coincide with a clock edge which guarantees no tristate overlap. In this case, on the first clock edge, the non-microprocessor bus master user requests use of the bus by asserting the HOLD input and on a second clock edge, the microprocessor can acknowledge the request by by forcing the HLDA output active and releasing its address bus. On a third clock edge, the non-microprocessor bus master is able to place its address onto the microprocessor bus and then on a fourth clock edge, a bus slave receiving unit can strobe or receive the address placed on the microprocessor bus.

While this scheme provides a high level performance, it becomes desirable to have a minimum time between transitions, particularly where there is a requirement for more switching between microprocessor and non-microprocessor bus users.

Accordingly, it is a primary object of the present invention to provide a bus access arrangement in which a minimum amount of time is required for transitions between different bus users.

SUMMARY OF THE INVENTION

The above and other objects of the present invention are achieved in a preferred embodiment of the present invention in which a high performance microprocessor bus state machine couples to a synchronous local bus in common with another state machine for accessing a local memory according to a preestablished bus protocol. Apparatus associated with the local memory couples to the local bus and includes circuit means for combining the state of a predetermined protocol bus signal indicating the release of the local bus and a portion of the clock signal which is not used for synchronizing the operations of the state machines. The resulting signal is used for applying required address and control signals in advance to the local bus enabling the non-microprocessor state machine to generate the required address strobe to local memory on the next clock which follows the release of the local bus by the microprocessor.

This arrangement improves system performance by eliminating a clock cycle each time control of the local bus is passed between the microprocessor bus state machine and another state machine which shares the local bus in accessing local memory. Additionally, the present invention achieves this advantage while still ensuring that there is no tristate overlap occurring during such address bus transitions.

The above objects and advantages of the present invention will be better understood from the following description when taken in connection with the accompanying drawings.

DETAILED DESCRIPTION OF THE PREFERRED EMBODIMENT

Figure 1:
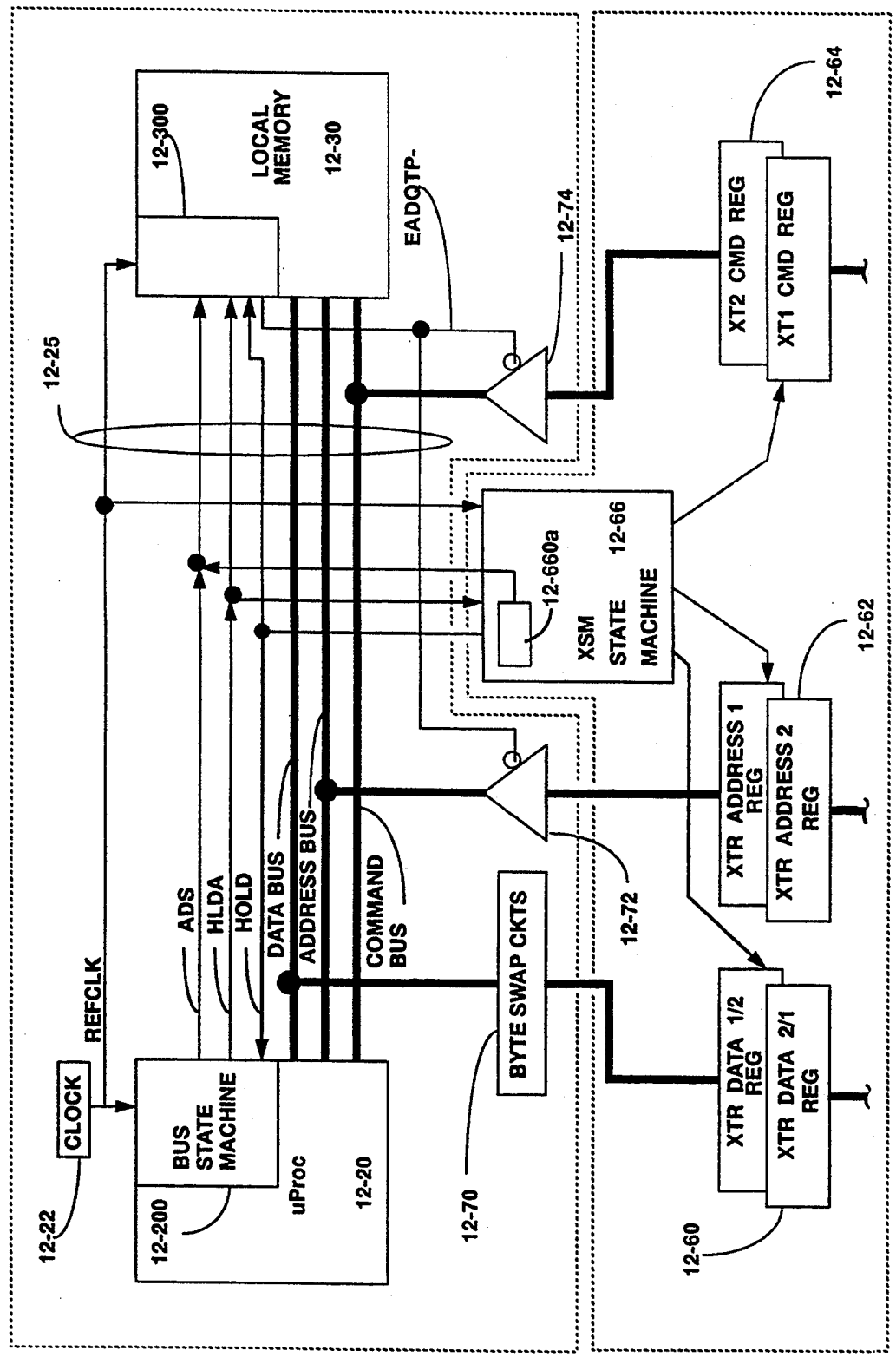
FIG. 1 is a block diagram which illustrates a system which incorporates the apparatus of the present invention.

Description of FIG. 1

FIG. 1 shows in greater detail, a processing unit which includes the apparatus of the present invention. As seen from FIG. 1, the processing unit 12-2 includes a microprocessor 12-20, a local memory 12-30 and interface buses which couple to bus interface circuits as explained herein. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing.

In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock Signal REFCLK of 33 MHz which provides the fundamental timing and internal operating frequency for microprocessor 12-20, in addition to all of the other circuits which make up processor 12-2. The system and bus interface circuits, input and output registers and other state machines, such as 12-66, not shown, are contained on the mother board. These two boards make up the entire processing unit 12-2.

In greater detail, the microprocessor 12-20 and local memory 12-30 are tightly coupled to the address, data and command/control processor bus lines of local bus 12-25, as shown. State machine 12-200 is used to control the microprocessor's access to local bus 12-25 by the generation of the proper bus protocol as a function of control signals generated by an external state machine (XSM) 12-66. As explained herein, the XSM 12-66 controls the accessing of local memory 12-30 by the generation of an address strobe (ADS) signal, in response to external requests received from a system bus, not shown, by a programmable array logic (PAL) circuit of block 12-660a. The equation for generating signal ADS is set forth in the Appendix.

The external requests received from a system bus (not shown) are loaded into the receive data, address and command registers, not shown. The address and command signals are converted into the appropriate form by address and command converter circuits, not shown, and stored in available registers of the two sets of queue registers of blocks 12-62 and 12-64. As shown, the registers of block 12-62 connect in common. Thereafter, the stored address and command signals are applied to the processor bus 12-25 via the tristate driver circuits of blocks 12-72 and 12-74, in response to an enabling signal EADQTP—, generated by a programmable array logic (PAL) circuit 12-300 which forms part of the apparatus of the present invention. The equations for generating signal EADQTP— is set forth in the Appendix.

Any data associated with an external request loaded into the receive register, not shown, is reordered and stored into the appropriate one of the registers of block 12-60 which connect in common. The different bytes of the data words are swapped from the so-called big endjan format of the system bus to the little endjan format utilized by microprocessor 12-20. This is accomplished by byte swap circuits of block 12-70 which is implemented by the proper reordering of connector pin connections.

Figure 2:
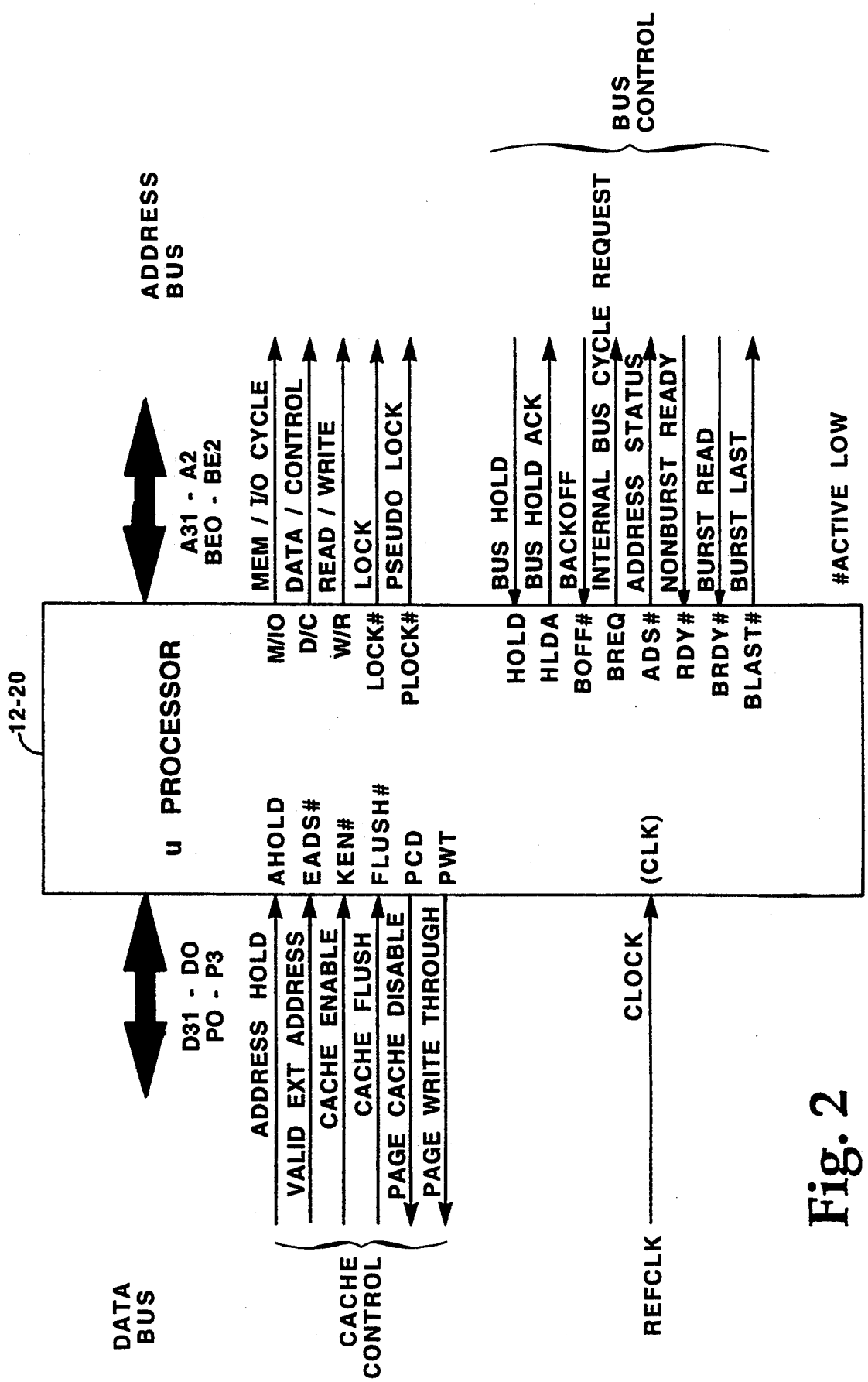
FIG. 2 illustrates in greater detail the microprocessor of FIG. 1.

Description of FIG. 2

FIG. 2 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability.

The cache control section includes six pins for controlling the microprocessor's internal cache. The cache enable (KEN) input is most frequently used to disable areas of memory that cannot be cached. The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine 12-200. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

For further information regarding the use of these signals, reference may be made to the Intel publication entitled, "i486 MICROPROCESSOR," dated November, 1989, Order Number: 240440-002.

DESCRIPTION OF OPERATION

With reference to FIGS. 1 and 2, the operation of the apparatus of the present invention will now be described with reference to the timing diagram of FIG. 3.

The microprocessor bus state machine 12-200 controls the accessing of synchronous bus 12-25 for executing memory read/write operations and I/O operations. This state machine follows that of the microprocessor and in the preferred embodiment, follows the operation of the Intel 486 microprocessor. The state machine 12-200 starts in an idle state and remains in that state until it receives an internal request from the microprocessor in the absence of hold and signals being applied to the backoff control lines. When that occurs, it sequences to a first state T1 which corresponds to the first clock cycle of a bus cycle. In this state, the valid address and status lines are driven and the address strobe ADS is generated.

In the absence of a backoff signal, state machine 12-200 sequences to a second state T2. When in this state, the second and subsequent bus cycles are performed. During each such cycle, the data lines are driven in the case of a write operation or in the case of a read, the states of the ready (RDY) and burst ready (BRDY) lines are sampled.

The external state machine (XSM) 12-66 enables the processing of external read and write requests (i.e., requests received from the system bus) to local memory 12-30. The XSM state machine 12-66 starts in an idle state. In response to a read request, it applies an address to address buffers 12-72 and generates a HOLD signal. Signal HLDA from microprocessor 12-20 causes the XSM 12-66 to generate an address strobe ADS signal and then sequence to a read memory state. As described herein, the signal HLDA and the negative edge of signal REFCLK causes the circuits 12-300 of FIG. 1 to generate signal EADQTP-.

The XSM 12-66 then sequences to a send reply state where it awaits completion of the read operation. Upon receipt of a cycle over indication from the system bus, XSM 12-66 returns to the idle state. For a write request, a similar sequence of operations is performed and thereafter the XSM 12-66 enters a write state and returns to the idle state.

From a system performance point of view, it is important to be able to initiate a memory access as soon as possible. The apparatus of the present invention enables the XSM state machine 12-66 to initiate memory accesses as soon as possible without resulting in erroneous operations created by an overlap between tristate address and command outputs of the microprocessor 12-20 and XSM state machine 12-66.

According to the present invention, this is accomplished by utilizing additional apparatus to generate an enable address bus transfer signal using an alternate edge of the clock reference signal REFCLK, along with state of the hold acknowledge control signal (HLDA) which is used by microprocessor 12-20 to signal its release of local bus 12-25. This permits the XSM state machine 12-66 to be able to generate address strobe ADS as early as possible following the completion of the last transaction initiating the local memory read or write operation.

Figure 3:
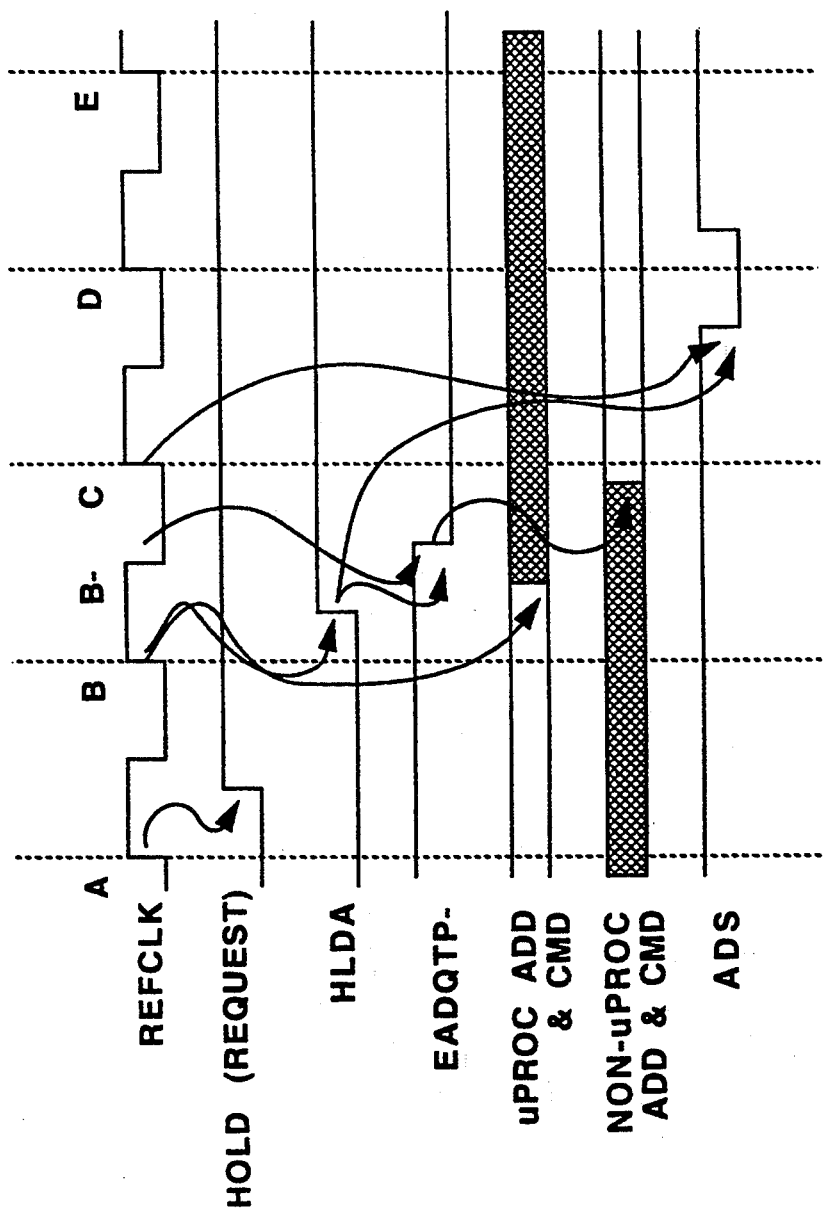
FIG. 3 is a timing diagram used to explain the operation of the present invention.

FIG. 3 illustrates in greater detail, the manner in which the apparatus of the present invention accomplishes the time savings. It is assumed that microprocessor 12-20, through its bus state machine 12-200, is in the process of completing a local memory operation or other type of operation on bus 12-25, and that XSM state machine 12-66 has requested use of bus 12-25 by forcing the HOLD line to a binary ONE or high as shown in FIG. 3. Thus, on the leading or positive going edge of REFCLK clock pulse A, the XSM state machine 12-66 requests the use of bus 12-25 by signal HOLD. On the leading edge of REFCLK clock pulse B, microprocessor bus state machine 12-200 acknowledges its release of bus 12-25 by signal HLDA.

The PAL circuit 12-300 of FIG. 1, in response to signal HLDA and the trailing or negative going edge of REFCLK clock pulse B, generates as an output signal EADQTP-. At that time, the address and command contained in a selected one of the registers 12-62 and 12-64 are applied to the address and command lines of bus 12-25 as indicated in FIG. 3.

Within a minimum time thereafter, the address strobe and start generator PAL circuit 12-660a generates address strobe signal ADS by driving the address strobe (ADS) line low. This produces address strobe ADS signal which signals local memory 12-30 that the address and command of a request have been applied to the address and command lines of bus 12-25.

The XSM state machine PAL circuit 12-660a generates the ADS signal within a predetermined number of clock pulses defined by an external state machine counter following receipt of signal HLDA from microprocessor 12-20. The present invention enables this predetermined to be reduced by one clock pulse. This results in a savings of one clock pulse each time bus control is passed from microprocessor 12-20 to XSM state machine 12-66.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

Description of equation symbols:
(Where # = OR; ! = negation; and & = AND)
Where DB,QB and HOT are symbol prefixes where the symbol ":" designates a register equation and the symbol = designates a combinatorial logic equation 1. The XSM state machine PAL circuit 12-660a generates signal ADS according to the following equation:
   QBADS:    = XINIDLE & (HOTHLDA & QBHOLD) & !QBADS
   where
   XINIDLE    = XSMSTOP # MBMCLR # (S_REG = idle) & !XSMSTRT
   where
   S_REG    = B00000.

2. Local memory PAL circuit 12-300 generates signal !EADQTP according to the following equation:
   EADQTP-    = EADQTPI
   where
   EADQTPI    = !REFCLK & DBHLDA & QBHOLD # EADQTPI & QBHOLD.

While in accordance with the provisions and statues there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system comprising:
   a local memory;
   a first synchronous state machine for generating commands to said local memory according to a predetermined bus protocol for performing read and write operations;
   a second synchronous state machine for generating commands to said local memory according to said predetermined bus protocol for performing read and write operations;
   a synchronous bus tightly coupling said first state machine, said second state machine and said local memory together;
   a clock generator coupled to said first state machine, to said local memory and to said second state machine, said clock generator generating a single frequency clock reference signal for synchronizing the operations of said system on a predetermined transition of said clock reference signal; and,
   programmable means associated with said local memory coupled to said synchronous bus and to said clock generator, said programmable means generating an output signal developed from using transitions alternate to said a predetermined transitions of said clock reference signal for providing earlier access to said local memory and a signal representative of a state of a predetermined one of said bus protocol signals by which said first state machine signals release of control of said bus, said output signal enabling early transfer of commands to said bus by said second state machine for execution by said local memory immediately following said release of control said first state machine.

2. The system of claim 1 wherein said second state machine includes means for generating a predetermined initial protocol signal for initiating a next read or write operation to said local memory immediately following completion of an operation initiated by said first state machine.

3. The system of claim 2 wherein said commands each include address and command signals and wherein said predetermined initial protocol signal corresponds to an address strobe signal for signaling said local memory of application of address and command signals of a next command to said bus.

4. The system of claim 1 wherein said first state machine and said second state machine, each include tristate circuits used to apply said read and write commands to said bus, said output signal enabling said tristate circuits of said second machine to apply said commands to said bus without overlapping with commands being applied by said tristate circuits of said first state machine.

5. The system of claim 1 wherein said predetermined transitions correspond to positive or leading edges of said clock reference signal.

6. The system of claim 5 wherein said alternate transitions correspond to negative or trailing edges of said clock reference signal.

7. The system of claim 1 wherein said programmable means includes a programmable array logic (PAL) circuit coupled to said clock generator circuit for receiving said clock reference signal for synchronizing operations and is coupled to receive from said bus, input signals corresponding to predetermined ones of said bus protocol signals for generating said output signal.

8. The system of claim 1 wherein said second state machine includes a PAL circuit connected to said clock generator circuit for receiving said clock reference signal for synchronizing operations, said PAL circuit being programmed to generate said address strobe within a minimum number of said predetermined transitions of said clock reference signal following receipt of said predetermined protocol signal.

9. The system of claim 8 wherein said predetermined protocol signal corresponds to a hold acknowledge signal.

10. The system of claim 8 wherein said minimum number of transitions of said predetermined clock reference signal corresponds to an occurrence of a next predetermined transition of the clock reference signal.

11. The system of claim 1 wherein said first state machine is included in a high performance microprocessor.

* * * * *